S. HATASHITA.
SELF PROPELLED VEHICLE.
APPLICATION FILED APR. 27, 1918.

1,286,615.

Patented Dec. 3, 1918.

Inventor
SEZO HATASHITA.

By Ralzemond A. Parker
Attorney

UNITED STATES PATENT OFFICE.

SEZO HATASHITA, OF DETROIT, MICHIGAN.

SELF-PROPELLED VEHICLE.

1,286,615.  Specification of Letters Patent.  Patented Dec. 3, 1918.

Application filed April 27, 1918. Serial No. 231,073.

*To all whom it may concern:*

Be it known that I, SEZO HATASHITA, a subject of the Emperor of Japan, residing at Detroit, county of Wayne, State of Michigan, have invented a certain new and useful Improvement in Self-Propelled Vehicles, and declare the following to be a full, clear, and exact description of the same, such as will enable others skilled in the art to which it pertains to make and use the same, reference being had to the accompanying drawings, which form a part of this specification.

My invention relates to self-propelled vehicles and an object of my improvements is to provide a transmission gear adapted to be used when a pleasure vehicle is adapted to commercial purposes.

I secure this object in the device illustrated in the accompanying drawing in which.

*a* is the rear end of the engine and gear casing of a Ford automobile. *b* is the semispherical shell having a flange $b^2$ secured to a flange at the end of the casing *a* and extending into said casing with its concave wall outward as shown. The shell *b* affords a bearing $b^3$ for the driving shaft *c*. *d* is a connecting piece fitting in a socket in the end of the shaft *c* to connect said shaft with the transmission mechanism.

I provide a piece *e* having an annular flange at its periphery adapted to fit against and be secured to the flange $b^2$ of the shell *b*. $e^2$ is a bearing coaxial with the bearing $b^3$ formed in the piece *e* and provided with a hardened ring $e^3$ around its inner wall. *f* is a cylindrical rotating part having a flange $f^2$ formed around its rear end and provided with grooves around its periphery in one of which grooves fit the rollers *g* and in the other of said grooves a dust excluding washer *h*. The cylindrical rotating piece *f* is formed to engage the connecting piece *d* and in so doing to fit within the bearing $e^2$ with its rollers *g* engaging against the inner surface of the hardened ring $e^3$. The washer *h* fits in the groove in the piece *f* and bears against the inner surface of the bearing $e^2$ to exclude the dust from the contiguous parts of the bearing. *j* is a casing inclosing a universal joint *k* by which the piece *f* is connected to the transmission shaft *m*.

It will be observed that the bearing $e^2$ is of considerable diameter affording large wearing surfaces and that the piece *f* affords an arbor carrying its own friction reducing elements *g* and adapted to be inserted as a whole and withdrawn from the bearing *e*.

Figure 1:
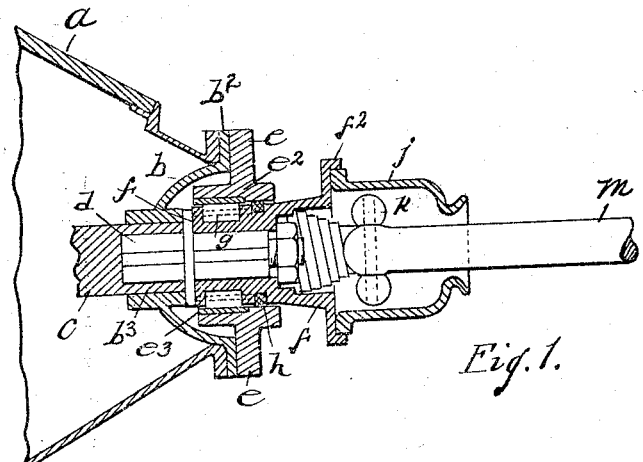
Figure 1 is a section of an apparatus embodying my invention and so much of an automobile as is necessary to illustrate its connection therewith.
Figure 2:
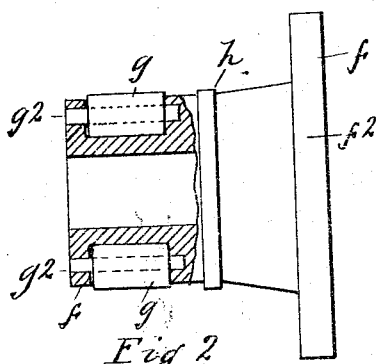
Fig. 2 is a plan view partly in section of the rotating flanged cylinder forming a part of my invention.
Figure 3:
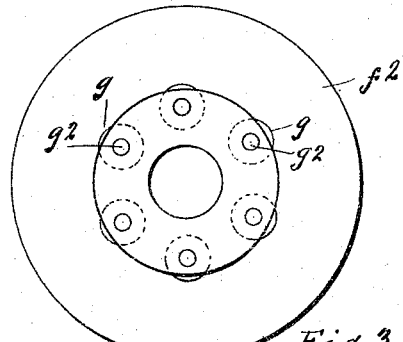
Fig. 3 is an end elevation looking from the right of Fig. 2.
Figure 4:
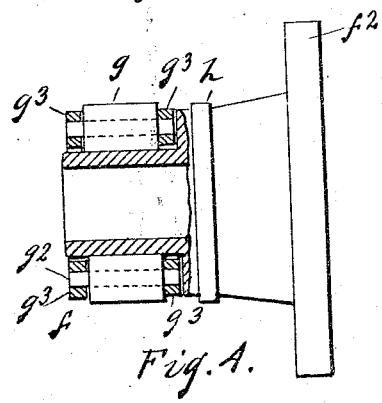
Fig. 4 is a view similar to Fig. 2 showing a modified construction.
Figure 5:
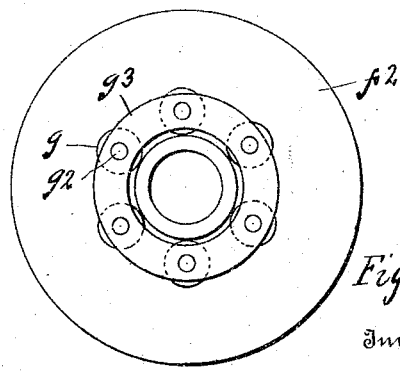
Fig. 5 is an end elevation looking from the right of Fig. 4.

The rollers *g* may be pivoted upon pins $q^2$, as shown in Figs. 2 and 3, or they may be formed in a cage, as shown in Fig. 4, and slipped over the end of the piece or washer *f*, as shown in Figs. 4 and 5.

What I claim is:

1. In combination with a casing end having a bearing for the power transmitting shaft, a piece *e* adapted to be secured to said casing end and provided with a bearing surface coming axially in line with the bearing on said casing end, and an arbor carrying friction reducing means adapted to be inserted and removed from the bearing in the piece *e*.

2. In combination with a casing end having a bearing for the power transmitting shaft, a piece *e* adapted to be secured to said casing end and provided with a bearing surface coming axially in line with the bearing on said casing end, and an arbor carrying friction reducing means adapted to be inserted and removed from the bearing in the piece *e*, and in so doing be engaged and disengaged from the power shaft.

3. In combination with a casing end having a bearing for the power transmitting shaft, a piece *e* adapted to be secured to said casing end and provided with a bearing surface coming axially in line with the bearing on said casing end, and an arbor carrying friction reducing means adapted to be inserted and removed from the bearing in the piece *e*, said arbor being provided with a peripheral groove adapted to receive a dust excluding washer for the purpose described.

4. In combination with a casing end having a bearing for the power transmitting shaft, a piece $e$ adapted to be secured to said casing end and provided with a bearing surface coming axially in line with the bearing on said casing end, and an arbor carrying friction reducing means adapted to be inserted and removed from the bearing in the piece $e$, said arbor being provided with a flange at its outer end adapted to be secured to the rest of the transmission mechanism of a vehicle.

In testimony whereof, I sign this specification.

SEZO HATASHITA.